F. HYMANS.
CUSHION BRAKE.
APPLICATION FILED NOV. 27, 1917.
1,399,560.
Patented Dec. 6, 1921.
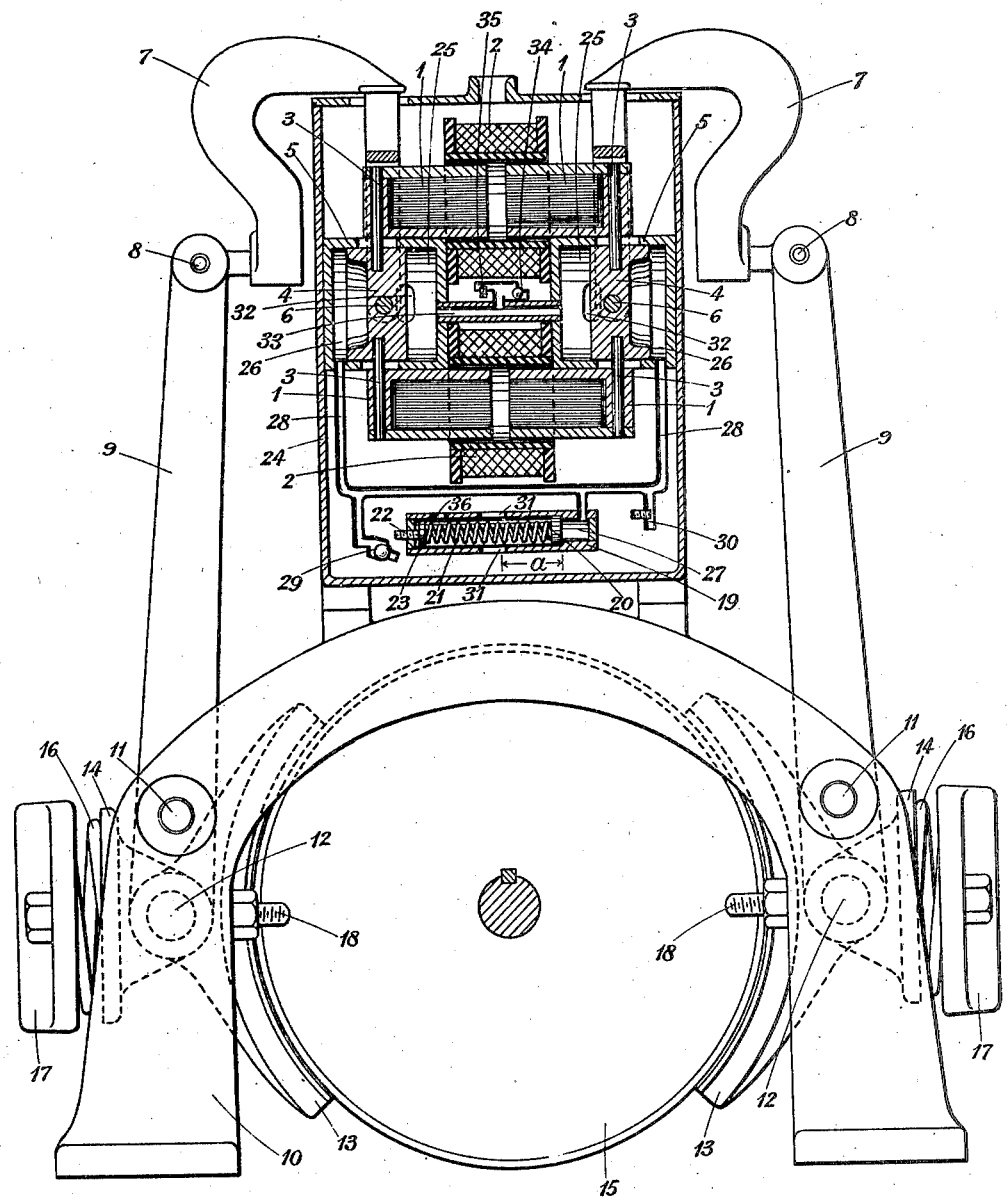
Inventor
Frederich Hymans
By his Attorney
L. N. Campbell

UNITED STATES PATENT OFFICE.

FREDERICK HYMANS, OF GLEN RIDGE, NEW JERSEY, ASSIGNOR TO OTIS ELEVATOR COMPANY, OF JERSEY CITY, NEW JERSEY, A CORPORATION OF NEW JERSEY.

CUSHION-BRAKE.

1,399,560.

Specification of Letters Patent.   Patented Dec. 6, 1921.

Application filed November 27, 1917.   Serial No. 204,151.

*To all whom it may concern:*

Be it known that I, FREDERICK HYMANS, a citizen of the Netherlands, residing in Glen Ridge, in the county of Essex and State of New Jersey, have invented a new and useful Improvement in Cushion-Brakes, of which the following is a specification.

My invention relates to brake controlling devices, and constitutes an improved means for controlling brakes for a cushioned application, and for a quick release without injury to the brake releasing mechanism. This invention is especially adapted to use in electromagnetic brakes as employed in an elevator system, although broad in scope and capable of a general application in any apparatus, wherein brake members are moved into and out of frictional contact with one another.

An object of my invention is the provision of an improved practical means for effecting a smooth and gradual application of braking force, such means being applicable to brakes in which the range of action of the moving parts is very small.

A further object is the provision in a cushion brake, of means for maintaining, when once adjusted, a constant initial minimum braking action, with subsequent gradual increase to maximum braking action, and means to insure an immediate application of the minimum braking action when the brake applying apparatus is brought into operation, all independent of conditions arising from wear on the braking members.

A further object is the provision in a cushion brake, comprising symmetrical parts operating in unison, of common adjusting means, each adjustment of which will affect at once the operations of all such corresponding parts.

A further object is the provision in an electromagnetically released brake, of means for effecting a quick release of the braking members followed by a retarded movement of the electromagnet cores and parts connected therewith, to prevent a slamming together of the cores. Other objects of my invention will appear hereinafter.

The accompanying drawing is a sectional elevation of my invention embodied in a brake apparatus of well-known type. Cores 1 of electromagnets 2 are connected by pins 3 with pistons 4, which pistons work in cylinders 5. Pins 6 connect pistons 4 with movable arms 7, which arms are pivoted at connections 8 to levers 9. The levers are pivoted to a rigid frame 10 at connections 11, and carry at their other ends, through pivotal connection 12, the brake shoes 13 and members 14, through which members spring pressure is transmitted to the brake shoes, here shown in frictional contact with friction pulley 15. Compression springs 16 act between members 14 and abutments 17, which abutments are secured to the frame 10 by means of bolts 18, whose adjustment regulates the compression of the springs.

An auxiliary cylinder 19, preferably of relatively small bore, is provided in which is a piston 20, normally held seated by a spring 21 whose compression is adjustable by the manipulation of a set screw 22 against a collar 23. The electromagnets with their cores, and the cylinders described are inclosed in a casing 24, which is mounted on the frame 10 and serves as a reservoir for oil or other fluid, the circulation of which, through the cylinders, controls the operation of the mechanism as hereinafter described.

On opposite sides of pistons 4, in the cylinder 5, are cushion chambers 25 and 26, and in the cylinder 19 is an auxiliary cushion chamber 27 connected by pipe or passage 28 with the cushion chambers 26. Chamber 27 may be considered as a common extension of chambers 26. Situated in the passage 28 is check valve 29 operating to allow fluid to flow unrestricted from the fluid reservoir into but not out of chambers 26 and 27. Also situated in passage 28 is adjustable throttle valve 30, through which the fluid admitted to chambers 26 and 27 may be ejected by movement of pistons 4 and 20 into the fluid reservoir. Valves 29 and 30 may be of various types, may be provided in any number to insure positive operation, and may be situated at any place in passage 28 or in cushion chambers 26 and 27.

In the walls of cylinder 19 are apertures 31 connecting the interior of the cylinder with the fluid reservoir, and connecting chamber 27 with the fluid reservoir when piston 20 has been moved away from its seat through approximately the distance "$a$." In the particular construction here shown, I provide also aperture 36 to connect the interior of cylinder 19 with the fluid reservoir.

In the walls of cushion chambers 25, in cylinders 5, are apertures 32 connecting the chambers with the fluid reservoir, and so situated with regard to the path of travel of pistons 4 that the pistons in moving in an inward direction will close the apertures before reaching their limits of travel. Chambers 25 are connected with each other by pipe or passage 33 in which is situated check valve 34 operating to allow fluid to flow unrestricted from the fluid reservoir into but not out of chambers 25. Also situated in passage 33 is adjustable throttle valve 35 through which the fluid admitted to chambers 25 may be ejected, by movement of pistons 4, into the fluid reservoir. Valves 34 and 35 may be of various types, may be provided in any number to insure positive operation, and may be situated at any place in passage 33 or in chambers 25.

The accompanying drawing shows the apparatus at the completion of the brake applying operation, with electromagnets deenergized and maximum braking force applied. A complete cycle of operation of the apparatus takes place as follows.

When electromagnets 2 are energized, cores 1 are drawn inward carrying with them pistons 4 in cylinders 5, and releasing the brake shoes from contact with the friction pulley. The fluid in cushion chambers 25 is expelled through apertures 32 until the pistons have traveled sufficient distance to close the apertures after which the fluid is ejected from the chambers through passage 33 and throttle valve 35 until the limits of travel of the pistons are reached by the meeting of the electromagnet cores. The rate of travel of pistons 1 after apertures 32 have been closed may be controlled by adjusting throttle valve 35.

The results of the operation described is an initial unretarded movement of cores 1 and pistons 4, followed by a retardation in the movement of the parts at the completion of the stroke to prevent a slamming together of the cores. It has heretofore been the practice to retard the movement of the cores through their entire brake-releasing stroke, with the resulting disadvantage of a slow release of the brake shoes, and, in alternating current brakes, of prolonging the period during which the magnet takes a large starting current from the line. In my invention, however, the retardation occurs at a point very near the completion of the stroke, thereby permitting a quick release of the brake shoes. Furthermore, the air gap between the magnet cores rapidly decreases, and at the time that the retardation occurs the same will be so small as not to entail an appreciable excess of current above that required when the cores are sealed together.

Now to apply the braking force, electromagnets 2 are deënergized and springs 16 act to bring the brake shoes into contact with the friction pulley at the same time moving through members 14, levers 9, and arms 7, the pistons 4, in an outward direction, and expelling fluid from chambers 26 through passages 28 into chamber 27 of cylinder 19, so forcing piston 20 away from its seat against the compression of spring 21. Thus the greater part of the force of spring 16 is expended in so actuating pistons 4 and 20 with the result that the brake shoes are brought immediately but with greatly reduced pressure into contact with the friction pulley. The compression of spring 21 now acts to return piston 20 to its seat, which is accomplished by ejecting fluid through throttle valve 30. As the fluid is so ejected the compression of spring 21 decreases with a resultant partial increase of pressure from springs 16 on the brake shoes until piston 20 is again seated, at which time no further resistance is offered to the action of springs 16, which now exert their full maximum pressure on the brake shoes.

It will be seen that with wear on the brake shoes and friction pulley, and a resultant increase of air gap between the magnet cores, the distance of travel of pistons 4 and the volume of fluid forced into cylinder 19 will become correspondingly greater. The result of this condition would be to prolong the cushioning action to too great an extent, and with increased wear would further result in a delay in the initial application of the brake shoes, necessitating frequent adjustments to maintain a constant braking action. To meet this condition, I have provided apertures 31 in cylinder 19 in order that when piston 20 has been moved through approximately a distance "a" the cushion chamber 27 will become connected with the fluid reservoir, and all fluid forced into chamber 27 thereafter will escape through the apertures without further moving piston 20. Aperture 36 is provided to insure a free circulation of fluid behind piston 20. I thus limit the amount of force with which spring 21 is capable of resisting the action of spring 16 by limiting the stroke of piston 20, and by so doing provide an initial braking action constant when once adjusted, followed by a rate of increase to maximum braking action, also constant when once adjusted, independent of conditions arising from wear on the braking members.

Adjustment of the initial minimum brake pressure may be made by varying, through the adjusting means provided, the relative forces exerted by springs 16 and spring 21, while the time occupied in passing from minimum to maximum pressure may be varied at will according to operating requirements by adjusting throttle valve 30.

By connecting chambers 25 through passage 33 and furnishing throttle valve 35 to control the ejection of fluid from both chambers 25, I provide a common adjusting means each adjustment of which affects at once and alike the brake releasing operation of the corresponding parts on both sides of the apparatus. Also by connecting chambers 26 through passage 28, furnishing a common extension in chamber 27, and furnishing throttle valve 30 to control the ejection of fluid from both chambers 26; and further by furnishing set screw 22 to vary the compression of spring 21, I provide common adjusting means, each adjustment of which affects at once and alike the brake applying operation of the corresponding parts on both sides of the apparatus. Thus it will be seen that in providing in my invention the common adjusting means described, I insure an operation in unison of all corresponding parts.

In former types of similar cushion brakes, the operation in cushioning the brake application has been dependent upon springs acting against auxiliary pistons in the main cylinders, which pistons traveled only through the distance of movement of the magnet cores. In most brakes this distance is so small that it has been difficult to obtain a satisfactory positive spring action therein. To overcome this defect I utilize the movement of the pistons in the main cylinders to force fluid into a relatively small cylinder against a piston whose distance of travel will be greater than that of the main pistons so long as its area is less than the sum of the areas of the main pistons. Thus the distance of travel of the auxiliary piston may be made sufficiently great to compress a spring so that it will react in satisfactory manner and cause a positive cushioning action. Auxiliary cylinders might be provided in any number and might be provided for each main cylinder individually, but in the preferred arrangement here shown the desired results are accomplished with a minimum number of parts, and the coöperation of the main pistons is insured.

Obviously those skilled in the art may make various changes in the details, arrangements, and number of parts without departing from the spirit and scope of my invention, and I desire therefore not to be limited to the construction herein described.

I claim:—

1. In combination, a brake, brake applying means, main cylinders, pistons movable therein to control the operation of the brake applying means for a gradual operation, an auxiliary cylinder of smaller bore than the said cylinders, and a piston movable therein to regulate the movement of the main pistons, and pipes connecting the main and auxiliary cylinders.

2. In combination, a brake, brake applying means, main cylinders, pistons movable therein to control the brake applying means for a gradual operation, an auxiliary cylinder of smaller bore than the said cylinders, a piston movable therein to regulate the movement of the main pistons, pipes connecting the main and auxiliary cylinders, and means to control the operation of the piston in the auxiliary cylinder.

3. In combination, a brake, brake applying means, main cylinders, pistons movable therein to control the brake applying means for a gradual operation, an auxiliary cylinder of smaller bore than the said cylinders, a piston movable therein to regulate the movement of the main pistons, pipes connecting the main and auxiliary cylinders, means to control the operation of the piston in the auxiliary cylinder and means to limit the stroke of the same.

4. In combination, a brake, brake applying means, main cylinders, pistons movable therein to control the operation of the brake applying means, an auxiliary cylinder of smaller bore than the said cylinders, a piston movable therein to regulate the movement of the main pistons, a reservoir to contain a fluid to regulate the movement of the pistons, fluid passages for the fluid to pass between the main cylinders and the auxiliary cylinder, restricted passages between the cylinders and the reservoir for the fluid to pass, passages between the auxiliary cylinder and the reservoir for the fluid to pass, and means to limit the stroke of the piston in the auxiliary cylinder, and means to regulate the movement of the said piston.

5. In combination, a brake, brake applying means, main cylinders, pistons movable therein to control the brake applying means, an auxiliary cylinder of smaller bore than the main cylinders, a piston movable therein to regulate the movement of the main pistons, pipes connecting the main and auxiliary cylinders, a seat for the piston in the auxiliary cylinder, means to constrain the said piston in its seat, means to adjust the constraining means, and means to regulate the operation of the pistons.

6. In a cushion brake, means, comprising a main cylinder and a piston movable therein to control the brake applying means, an auxiliary cylinder and a piston therein, pipes connecting the cylinders, a spring behind the piston in the auxiliary cylinder, adapted to be compressed by the piston, and a discharge aperture in the auxiliary cylinder behind the piston, whereby a constant cushioning action in brake application is maintained independent of wear on the parts of the brake.

In testimony whereof, I have signed my name to this specification in the presence of two subscribing witnesses.

FREDERICK HYMANS.

Witnesses:
 ERNEST L. GALE, Jr.,
 HAZEL R. GATES.